US007065048B1

(12) United States Patent
Levy et al.

(10) Patent No.: US 7,065,048 B1
(45) Date of Patent: Jun. 20, 2006

(54) METHOD AND DEVICE FOR EFFICIENT BANDWIDTH MANAGEMENT

(75) Inventors: Yonatan Aharon Levy, Manalapan, NJ (US); Xiaowen Mang, Manalapan, NJ (US); Kamlesh T. Tewani, Freehold, NJ (US)

(73) Assignee: AT&T Corp., New York, NJ (US)

( * ) Notice: Subject to any disclaimer, the term of this patent is extended or adjusted under 35 U.S.C. 154(b) by 0 days.

(21) Appl. No.: 10/885,458

(22) Filed: Jul. 6, 2004

Related U.S. Application Data

(63) Continuation of application No. 09/722,898, filed on Nov. 27, 2000, now Pat. No. 6,967,921.

(51) Int. Cl.
*H04L 12/26* (2006.01)

(52) U.S. Cl. .................. 370/230.1; 370/230; 370/412

(58) Field of Classification Search ................ 370/230, 370/230.1

See application file for complete search history.

(56) References Cited

U.S. PATENT DOCUMENTS

| 6,556,578 | B1 * | 4/2003 | Silberschatz et al. | 370/412 |
| 6,560,230 | B1 * | 5/2003 | Li et al. | 370/395.42 |
| 6,570,883 | B1 * | 5/2003 | Wong | 370/412 |
| 6,633,540 | B1 * | 10/2003 | Raisanen et al. | 370/230.1 |
| 6,680,906 | B1 * | 1/2004 | Nguyen | 370/229 |
| 6,775,231 | B1 * | 8/2004 | Baker et al. | 370/230.1 |
| 6,788,646 | B1 * | 9/2004 | Fodor et al. | 370/230 |

OTHER PUBLICATIONS

S. Floyd and V. Jacobson, "Link-Sharing and Resource Management Models for Packet Networks", IEEE/ACM Transactions on Networking, vol. 3 No. 4, Aug. 1995, pp. 1-22.*

* cited by examiner

*Primary Examiner*—Seema S. Rao
*Assistant Examiner*—Michael J. Moore
(74) *Attorney, Agent, or Firm*—Michael N. Haynes; Dale R. Jensen

(57) ABSTRACT

The present invention provides a method, computer-readable medium and device for dynamically managing allocation of bandwidth in a packet network using a Dynamic Setting Scheme (DSS) for Class Based Queuing (CBQ). The method includes the steps of maintaining a minimized reserved portion of bandwidth to minimize delay jitter and maximizing a shared portion of bandwidth to maximize overall bandwidth utilization. Allocation of bandwidth may be based on a sharing tree hierarchical scheme that provides for temporary borrowing of bandwidth by real-time applications from bandwidth of non-real-time applications and blocks borrowing of bandwidth by non-real-time applications from bandwidth of real-time applications. DSS typically provides for using measurable parameters, such as queue length and number of borrowing attempts per a predetermined length of time/observation window, as control triggers for implementing adjustment of bandwidth allocation. In one embodiment, the steps include measuring a predetermined parameter at predetermined observation window times and dynamically adjusting allocated bandwidth for parent classes of real-time traffic by adjusting an average of the predetermined parameter to have a value within a predetermined stable region.

8 Claims, 3 Drawing Sheets

WHERE BORROWING PERMIT FOR $c_1 ... c_k$ PERMITS TEMPORARY BORROWING FROM RT 104 AND ROOT 102

WHERE BORROWING PERMIT FOR $c_{(k+1)} ... c_n$ PERMITS TEMPORARY BORROWING FROM NON-RT 106 ONLY

METHOD AND DEVICE FOR EFFICIENT BANDWIDTH MANAGEMENT

This is a continuation of Ser. No. 09/722,898, filed Nov. 27, 2000, now U.S. Pat. No. 6,967,921.

FIELD OF THE INVENTION

The present invention relates generally to bandwidth management, and more particularly to dynamic, real-time bandwidth management of traffic in Internet Protocol networks.

BACKGROUND OF THE INVENTION

Today's Internet Protocol (IP) networks mostly work as one-class, best-effort networks. As these networks evolve to Quality of Service (QoS)-enabled, multi-class, application-aware networks, bandwidth management will be one of the crucial resource management mechanisms to insure each application a fair share of bandwidth, especially at congestion points. There are several products, called bandwidth managers or packet shapers, that offer such a mechanism at the access points to or from the Wide Area Network (WAN). In particular, one such scheme, Class Based Queuing (CBQ), has gained significant popularity after being implemented in real bandwidth management products such as Xedia's Access Point® to guarantee bandwidth for applications and provide Quality of Service differentiation. Products offering CBQ are widely available and are being deployed in the field to guarantee bandwidth for real-time and other business-critical applications (e.g., voice, e-transactions). However, a challenging problem in putting these products into practical use is the need to configure them in a way that will match the needs of the particular site and links, whose bandwidth is allocated. There is a need for a method and device that dynamically provide real-time allocation of bandwidth for real-time and non-real-time applications based on measurements, thus enabling the use of bandwidth managers without the administrative burden of manual configuration and update.

SUMMARY OF THE INVENTION

The present invention provides a method for dynamically managing allocation of bandwidth in a packet network using a Dynamic Setting Scheme (DSS) for Class Based Queuing (CBQ). The method includes the steps of maintaining a minimized reserved portion of bandwidth to minimize delay jitter and maximizing a shared portion of bandwidth to maximize overall bandwidth utilization. Allocation of bandwidth may be based on a hierarchical-tree sharing scheme that provides for temporary borrowing of bandwidth by real-time or critical applications from bandwidth of non-real-time or non-critical applications and prevents borrowing of bandwidth by non-real-time or non-critical applications from bandwidth of real-time or critical applications. The DSS provides for using measurable parameters, such as queue length or number of borrowing attempts per a predetermined length of time, as control triggers for implementing adjustment of bandwidth allocation.

The present invention may also provide for dynamically managing allocation of bandwidth in a packet network using a Dynamic Setting Scheme (DSS) for Class Based Queuing (CBQ) using the steps of measuring a predetermined parameter at predetermined observation window times and dynamically adjusting allocated bandwidth for parent classes of real-time or critical traffic by adjusting an average of the predetermined parameter to have a value within a predetermined stable region. Again, dynamically adjusting allocated bandwidth, such as the DSS method of the present invention, may be based on a sharing tree hierarchical scheme that provides for temporary borrowing of bandwidth by real-time or critical applications from bandwidth of non-real-time or non-critical applications and blocks borrowing of bandwidth by non-real-time or non-critical applications from bandwidth of real-time or critical applications. The predetermined parameter measured may, for example, be queue length or number of borrowing attempts during a predetermined measurement window. Where the predetermined parameter is a number of borrowing attempts during a measurement window, a maximum bandwidth and a minimum bandwidth for the predetermined stable region may be determined by the following algorithm, where the subscript i stands for class i:

If $A_{i\_avg} < Thr(A_i)^{lower}$, $B_i = maximum(B_i - \omega_i^{down}, Min(B_i))$ Else If $A_{i\_avg} > Thr(A_i)^{upper}$, $B_i = minimum(B_i + \omega_i^{up}, Max(B_i))$ where $A_i$ is a number of borrowing attempts by class i during a most recent measurement window and $A_{i\_avg}$ is an average number of borrowing attempts/controlled state;

upper and lower thresholds for the predetermined stable region are preset at predetermined values:

$Thr(A_i)^{lower}$ is a lower threshold for borrowing attempts, where $Thr(A_i)^{lower} > 0$;

$Thr(A_i)^{upper}$ is a upper threshold for borrowing attempts, where $Thr(A_i)^{upper} > Thr(A_i)^{lower}$;

the increment and decrement units $\omega_i^{down}$ and $\omega_i^{up}$, which denote the update granularity on allocated bandwidth $B_i$, are preset at predetermined values;

$Max(B_i)$ is a maximum value of allocated bandwidth;

$Min(B_i)$ is a minimum value of allocated bandwidth; and exponential smoothing technique is used as follows, $A_{i\_avg} \Re (1-\alpha)*A_{i\_avg} + \alpha * A_i$, where a value of $\alpha$ is preselected as a negative power of two and $A_{i\_avg}$ is updated every observation window, a pre-determined parameter in seconds.

Where the predetermined parameter is a queue length, a lower threshold and an upper threshold for queue length for the predetermined stable region may be determined by:

If $Q_{i\_avg} < Thr(Q_i)^{lower}$, $B_i = maximum(B_i - \omega_i, Min(B_i))$

Else If $Q_{i\_avg} > Thr(Q_i)^{upper}$, $B_i = minimum(B_i + \omega_i, Max(B_i))$, $Q_i$ is an instantaneous measurement of queue length;

$Q_{i\_avg}$ is a calculated average value for an average queue length;

upper and lower thresholds are preset at predetermined values:

$Thr(Q_i)^{lower}$ is a lower threshold for queue length, where $Thr(Q_i)^{lower} > 0$; and $Thr(Q_i)^{upper}$ is an upper threshold for queue length where $Thr(Q_i)^{upper} > Thr(Q_i)^{lower}$.

The queue size for class i, which is also the upper bound for the queue length $Q_i$, is related to an upper bound on the delay jitter as:

Delay_jitter_$i = max Q_i / B_i$

Hence, if a jitter upper bound Delay_jitter_$i$ is preselected, then a linear relationship exists between $maxQ_i$ and $B_i$, the allocated bandwidth.

The present invention may also be implemented by a computer-readable medium having computer-executable instructions for dynamically managing allocation of bandwidth in a packet network using a Dynamic Setting Scheme (DSS) for Class Based Queuing (CBQ). The computer-executable instructions may include measuring a predetermined parameter at predetermined observation window times and dynamically adjusting allocated bandwidth for parent classes of real-time or critical traffic by adjusting an average of the predetermined parameter to have a value within a predetermined stable region.

The present invention may be implemented by a device that includes a parameter measuring unit and a bandwidth sharing determining unit. The parameter measuring unit is coupled to the bandwidth sharing determining unit and is used for (i) measuring a predetermined parameter at predetermined observation window times, and (ii) dynamically adjusting allocated bandwidth for parent classes of real-time or critical traffic by adjusting an average of the predetermined parameter to have a value within a predetermined stable region. The DSS generally provides for using measurable parameters such as queue length or number of borrowing attempts per a predetermined length of time or predetermined measurement window as control triggers for implementing adjustment of bandwidth allocation. Where the predetermined parameter is a number of borrowing attempts during a measurement window of the DDS method, a maximum bandwidth and a minimum bandwidth for the predetermined stable region may be determined as described above. Where the predetermined parameter is a queue length of the DDS method, a lower threshold and an upper threshold for queue length for the predetermined stable region may be determined as described above.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

In previous implementations, classes with heavy-volume traffic tended to dominate the bandwidth for a relatively long period of time and cause a high delay jitter for classes with light traffic volume even if the latter were allocated sufficient bandwidth. Since the traffic volume of some real-time applications, e.g., voice, is relatively low and the bandwidth consumption of such applications is more predictable, it is desirable to separate these applications from the rest of the traffic, which includes many data applications with unpredictable volume and bursty bandwidth consumption. However, while total separation provides security, it also reduces the total utilization of bandwidth. One alternative is to allow voice traffic to borrow bandwidth from data traffic, but not allow data to borrow from voice. In this situation, one wants to reserve sufficient bandwidth for voice and, at the same time, avoid over-engineering in order to increase the bandwidth utilization.

Due to the fact that traffic conditions are dynamic and somewhat unpredictable, it is not possible to find a value for bandwidth allocation that satisfies the desired objectives in all circumstances. The present invention implements a bandwidth sharing hierarchy and a dynamic scheme for setting bandwidth management parameters. Since Internet Protocol (IP) technology is implemented in various access methods, i.e., Cable Plant, fixed wireless, and DSL, and also in the backbone, the present invention has far-reaching applicability in the present and future networks. The present invention provides capabilities for more efficient use of bandwidth and the ability to use the same network for both voice and data applications. Moreover, the present invention provides for integrating voice traffic and data traffic and provides mechanisms for allocation of bandwidth to priority data or voice-over-IP (VOIP) services that ensure that valuable corporate resources are available to critical business applications.

For example, where bandwidth is allocated according to application delay requirements, assume that there are two types of traffic: real-time and non-real-time traffic. There are a predetermined number n of classes, and each type of traffic may have one or more leaf classes: $c_1$ through $c_k$ are classes of real-time or other critical applications, while the remaining classes $c_{k+1}$ through $c_n$ include non-critical applications. The objectives are twofold:

1. Minimize the delay jitter for real-time applications by reserving sufficient bandwidth.
2. Maximize the overall bandwidth utilization by allowing bandwidth sharing across non-real-time applications.

Figure 1:
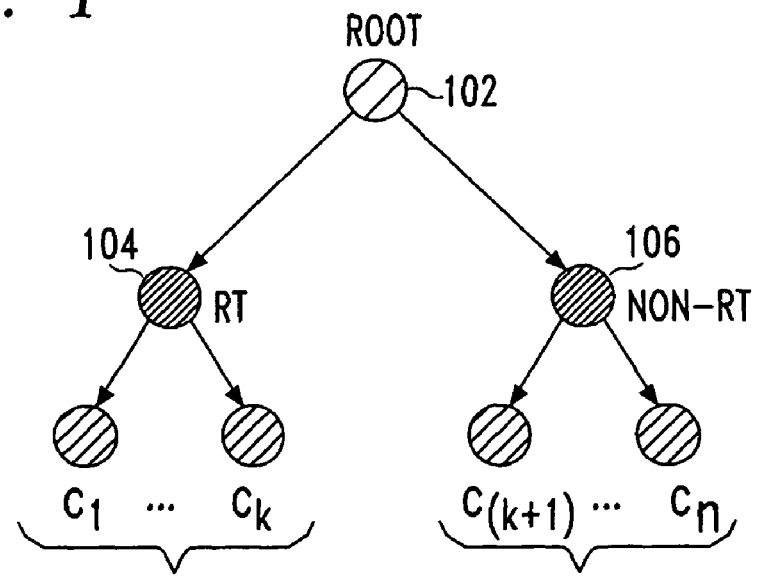
FIG. 1 is a schematic representation of a sharing tree hierarchy with three control states generated using limits and thresholds in accordance with the present invention.

The above goals are achieved by setting a borrowing permit according to the traffic's delay requirement, i.e., only allowing real-time applications to borrow from non-real-time, but not vice versa. As a result, one needs an extra level in the sharing tree hierarchy as is shown in FIG. 1. If $c_1$ exceeds its allocated bandwidth, it can temporarily borrow from all its parent classes, i.e., RT 104 and Root 102. On the other hand, if $c_{(k+1)}$ exceeds its allocation, it can only borrow from NON-RT 106. Such a sharing hierarchy includes reservation and sharing strategies. However, due to the traffic dynamics, a static allocation that meets the performance objectives in all circumstances has not been available. To guarantee real-time application delay requirements, one needs to allocate sufficient bandwidth to such applications. On the other hand, to maximize the bandwidth utilization, one must maintain the reserved portion of bandwidth as small as possible and maximize the shared portion.

For a better tradeoff between guaranteeing delay and maximizing the utilization, the present invention provides a dynamic scheme that adapts to traffic variations. The present invention utilizes a scheme that is simple enough to be readily implemented—a dynamic setting scheme (DSS) for CBQ. The fundamental concept embedded in DSS is the use of measurable parameters as control triggers. The measurable parameters may be related to performance objectives. For example, queue length may be directly related to delay and delay jitter, which are the main performance measures for real-time traffic. Moreover, borrowing attempts may be used to indicate whether the allocated bandwidth is sufficient. Both queue length and borrowing attempts are easily measured and therefore may be used as control triggers in a DSS scheme. However, other measurable parameters can be used as control triggers in the DSS scheme.

Two examples of DSS are described below wherein queue length and borrowing attempts are used as control triggers. In the first example, where DSS is triggered by borrowing attempts, let $A_i$ be the number of borrowing attempts initiated by class i during an observation window. An "observation window" is a time interval during which the $A_i$ is measured. The objective of DSS is to dynamically adjust the allocated bandwidth for parent classes of real-time or critical traffic according to the number of borrowing attempts made by these classes during the most recent observation window. Since the traffic characteristics are unknown and changing, it is impossible to find an optimal $A_i$ that suits all circumstances. However, by keeping the above state variable within a desired region and allowing a certain degree of fluctuation within the desired region, the performance is kept at a satisfactory level. Therefore, two levels of thresholds are used for $A_i$, the desired region being designated as the "stable region". The performance is measured in terms of the delay and delay jitter of real-time classes and the utilization of the root class (which accounts for the total traffic).

The DSS scheme uses the average number of borrowing attempts, $A_{i\_avg}$, to trigger the control actions. The status of the state variable is checked on a periodic basis. If the state variable is in the stable region, no action needs to be taken. If the state variable is outside the stable region, the allocated bandwidth $B_i$ for the real-time class is updated, moving $A_{i\_avg}$ back into the stable region. As is known in the art, an exponential smoothing technique is used to calculate the average number of borrowing attempts. Such a smoothing technique avoids too much oscillation due to the effect of overreacting to the system's instantaneous fluctuations. The implication is that as long as the smoothed average values stay inside the stable region, certain incidences are permitted wherein the actual values of the state variable are outside the stable region, either higher than the upper threshold or lower than the lower threshold.

The parameters used in the algorithm are defined as follows. The first set of parameters includes the instantaneous measurement on the state variable and its calculated average value:

$A_i$: the number of borrowing attempts during the last measurement window; and $A_{i\_avg}$: the average borrowing attempts.

The following set of parameters consists of the upper and lower thresholds on the above state variable which are preset at predetermined desired values:

Thr$(A_i)^{lower}$: the lower threshold for borrowing attempts, e.g. Thr$(A_i)^{lower}$=2. One should note that Thr$(A_i)^{lower}$ cannot be set to zero.

Thr$(A_i)^{upper}$: the upper threshold for borrowing attempts, e.g. Thr$(A_i)^{upper}$=10.

The next parameter is the increment or decrement unit on the allocated bandwidth $B_i$ preset at a predetermined value (where i stands for class i):

$\omega_i^{down}$: the downward update granularity for allocated bandwidth $B_i$;

$\omega_i^{up}$: the upward update granularity for allocated bandwidth $B_i$;

The last two parameters are the upper and lower limits on the allocated bandwidth that are typically selected according to applications being used:

Max$(B_i)$: maximum value of allocated bandwidth;

Min$(B_i)$: minimum value of allocated bandwidth.

The average state variables may be obtained using the exponential smoothing technique as follows:

$$A_{i\_avg} \mathfrak{R} (1-\alpha)*A_{i\_avg}+\alpha*A_i,$$

where the value of $\alpha$ is chosen as a (negative) power of two, i.e., $2^{-n}$, n=0, 1, 2, . . . , which may be implemented with one shift and two additions. $A_{i\_avg}$ is updated every observation window, generally a pre-determined parameter in seconds.

Figure 3:
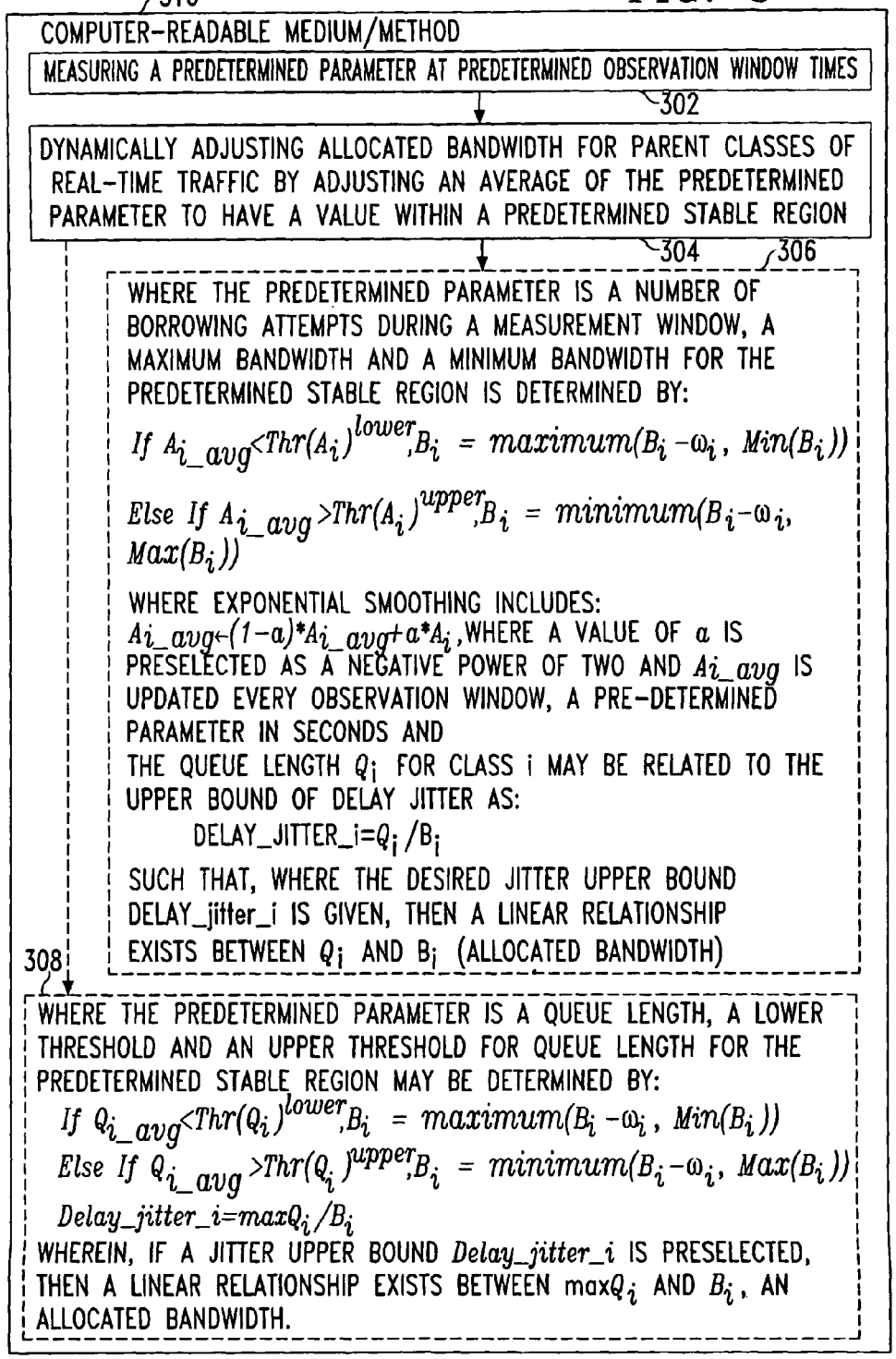
FIG. 3 is a flow chart and block diagram showing another embodiment of steps of a method and of a computer-readable medium for dynamically managing allocation of bandwidth in a packet network using a Dynamic Setting Scheme (DSS) for Class Based Queuing (CBQ) in accordance with the present invention.

Using the limits and the thresholds, three states are generated for control purposes, as is shown in FIG. 3. $A_{i\_avg}$ represents a controlled state. As long as the controlled state is outside the stable region, the value of allocated bandwidth $B_i$ will be updated to move the controlled state back to the stable region. Hence, the algorithm for DSS (306) is as follows:

If $A_{i\_avg}$<Thr$(A_i)^{lower}$, $B_i$=maximum($B_i-\omega_i^{down}$ Min$(B_i)$))

Else If $A_{i\_avg}$>Thr$(A_i)^{upper}$, $B_i$=minimum($B_i+\omega_i^{up}$, Max$(B_i)$))

In the second example, where DSS is triggered by queue length, queue length is used to trigger the DSS so as to control the delay jitter since delay jitter is one of the main performance measures in voice-over-IP applications. Queue length is selected as a control trigger because voice traffic needs to be given strict high priority while traversing the network. Thus, generally voice traffic will not encounter excessive queuing delay inside the network, and, for a given path, the propagation delay is fixed. Hence, the only source for delay jitter for voice traffic will be at the ingress queue. Moreover, where bandwidth is reserved for voice traffic at the bandwidth manager, the queue length $Q_i$ for class i may be related to the upper bound of delay jitter as:

$$\text{Delay\_jitter\_}i = \max Q_i / B_i$$

such that, where the desired jitter upper bound Delay_jitter_i is given, then a linear relationship exists between max$Q_i$ and $B_i$ (allocated bandwidth) (308).

The parameters used in the second example are defined as follows. The first set of parameters includes the instantaneous measurement on the state variable and its calculated average value:

$Q_i$: the queue length;

$Q_{i\_avg}$: the average queue length.

The following set of parameters consists of the upper and lower thresholds on the above state variable which are preset at predetermined values:

Thr$(Q_i)^{lower}$: the lower threshold for queue length, e.g., Thr$(Q_i)^{lower}$=2. One should note that Thr$(Q_i)^{lower}$ cannot be set to zero.

Thr$(Q_i)^{upper}$: the upper threshold for queue length, e.g. Thr$(Q_i)^{upper}$=10.

As is clear from the explanation above, replacing $A_{i\_avg}$ of the above DSS algorithm by $Q_{i\_avg}$ yields a DSS triggered by queue length.

Figure 2:
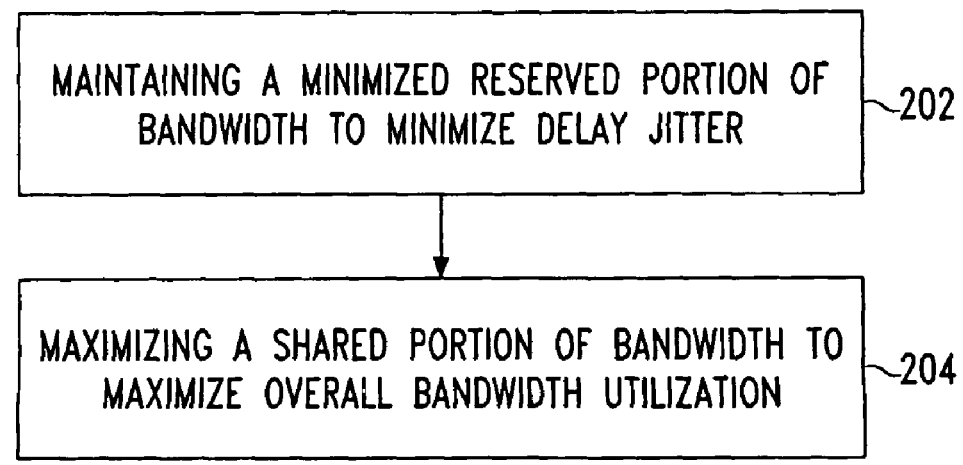
FIG. 2 is a flow chart showing steps for one embodiment of a method for dynamically managing allocation of bandwidth in a packet network using a Dynamic Setting Scheme (DSS) for Class Based Queuing (CBQ) in accordance with the present invention.

Thus, as shown in FIG. 2, the present invention may be implemented as a method for dynamically managing allocation of bandwidth in a packet network using a Dynamic Setting Scheme (DSS) for Class Based Queuing (CBQ). The steps of the method include: maintaining (202) a minimized reserved portion of bandwidth to minimize delay jitter and maximizing (204) a shared portion of bandwidth to maximize overall bandwidth utilization. Allocation of bandwidth may be based on a sharing tree hierarchical scheme that provides for temporary borrowing of bandwidth by real-time or critical applications from bandwidth of non-real-time or non-critical applications and blocks borrowing of bandwidth by non-real-time or non-critical applications from bandwidth of real-time or critical applications. The DSS may provide for using measurable parameters such as queue length or number of borrowing attempts per a predetermined length of time as control triggers for implementing adjustment of bandwidth allocation.

In another embodiment, as shown in FIG. 3, the method of the present invention provides for dynamically managing allocation of bandwidth in a packet network using a Dynamic Setting Scheme (DSS) for Class Based Queuing (CBQ), by utilizing the steps of: measuring (302) a predetermined parameter at predetermined observation window times and dynamically adjusting (304) allocated bandwidth for parent classes of real-time or critical traffic by adjusting an average of the predetermined parameter to have a value within a predetermined stable region. Where the predetermined parameter is a number of borrowing attempts during a measurement window, a maximum bandwidth and a minimum bandwidth for the predetermined stable region may be determined (306) by:

If $A_{i\_avg}$<Thr$(A_i)^{lower}$, $B_i$=maximum$(B_i\omega_i^{down}$, Min $(B_i))$ Else If $A_{i\_avg}$>Thr$(A_i)^{upper}$, $B_i$=minimum$(B_i+\omega_i^{up}$, Max$(B_i))$ Where $A_i$ is a number of borrowing attempts during a most recent measurement window and $A_{i\_avg}$ is an average number of borrowing attempts/controlled state;

upper and lower thresholds for the predetermined stable region are preset at predetermined values:

Thr$(A_i)^{lower}$ is a lower threshold for borrowing attempts, where Thr$(A_i)^{lower}$>0;

Thr$(A_i)^{upper}$ is a upper threshold for borrowing attempts, where Thr$(A_i)^{upper}$>Thr$(A_i)^{lower}$;

increment and decrement units $\omega_i^{down}$ and $\omega_i^{up}$, which denote the update granularity on allocated bandwidth $B_i$, are preset at predetermined values;

Max$(B_i)$ is a maximum value of allocated bandwidth;

Min$(B_i)$ is a minimum value of allocated bandwidth; and exponential smoothing technique is used as follows, $A_{i\_avg}\Re(1-\alpha)*A_{i\_avg}+\alpha*A_i$, where a value of $\alpha$ is preselected as a negative power of two and $A_{i\_avg}$ is updated every observation window, a pre-determined parameter in seconds.

Where the predetermined parameter is a queue length, a lower threshold and an upper threshold for queue length for the predetermined stable region may be determined (308) by:

If $Q_{i\_avg}$<Thr$(Q_i)^{lower}$, $B_i$=maximum$(B_i-\omega_i^{down}$, Min $(B_i))$ Else If $Q_{i\_avg}$>Thr$(Q_i)^{upper}$, $B_i$=minimum$(B_i+\omega_i^{up}$, Max$(B_i))$, $Q_i$ is an instantaneous measurement of queue length;

$Q_{i\_avg}$ is a calculated average value for an average queue length;

upper and lower thresholds are preset at predetermined values:

Thr$(Q_i)^{lower}$ is a lower threshold for queue length, where Thr$(Q_i)^{lower}$>0; and Thr$(Q_i)^{upper}$ is an upper threshold for queue length where Thr$(Q_i)^{upper}$>Thr$(Q_i)^{lower}$.

A queue size for class i, which is also an upper bound for a queue length $Q_i$, is related to an upper bound on a delay jitter as:

Delay_jitter_i=max$Q_i/B_i$

Hence, if a jitter upper bound Delay_jitter_i is preselected, then a linear relationship exists between max$Q_i$ and $B_i$, the allocated bandwidth.

In one embodiment, as shown in FIG. 3, a computer-readable medium 310 having computer-executable instructions may be utilized for dynamically managing allocation of bandwidth in a packet network using a Dynamic Setting Scheme (DSS) for Class Based Queuing (CBQ), wherein the computer-executable instructions comprise the steps of: measuring (302) a predetermined parameter at predetermined observation window times and dynamically adjusting (304) allocated bandwidth for parent classes of real-time or critical traffic by adjusting an average of the predetermined parameter to have a value within a predetermined stable region. The steps of the computer-executable instructions may also be implemented as described above for the method.

Figure 4:
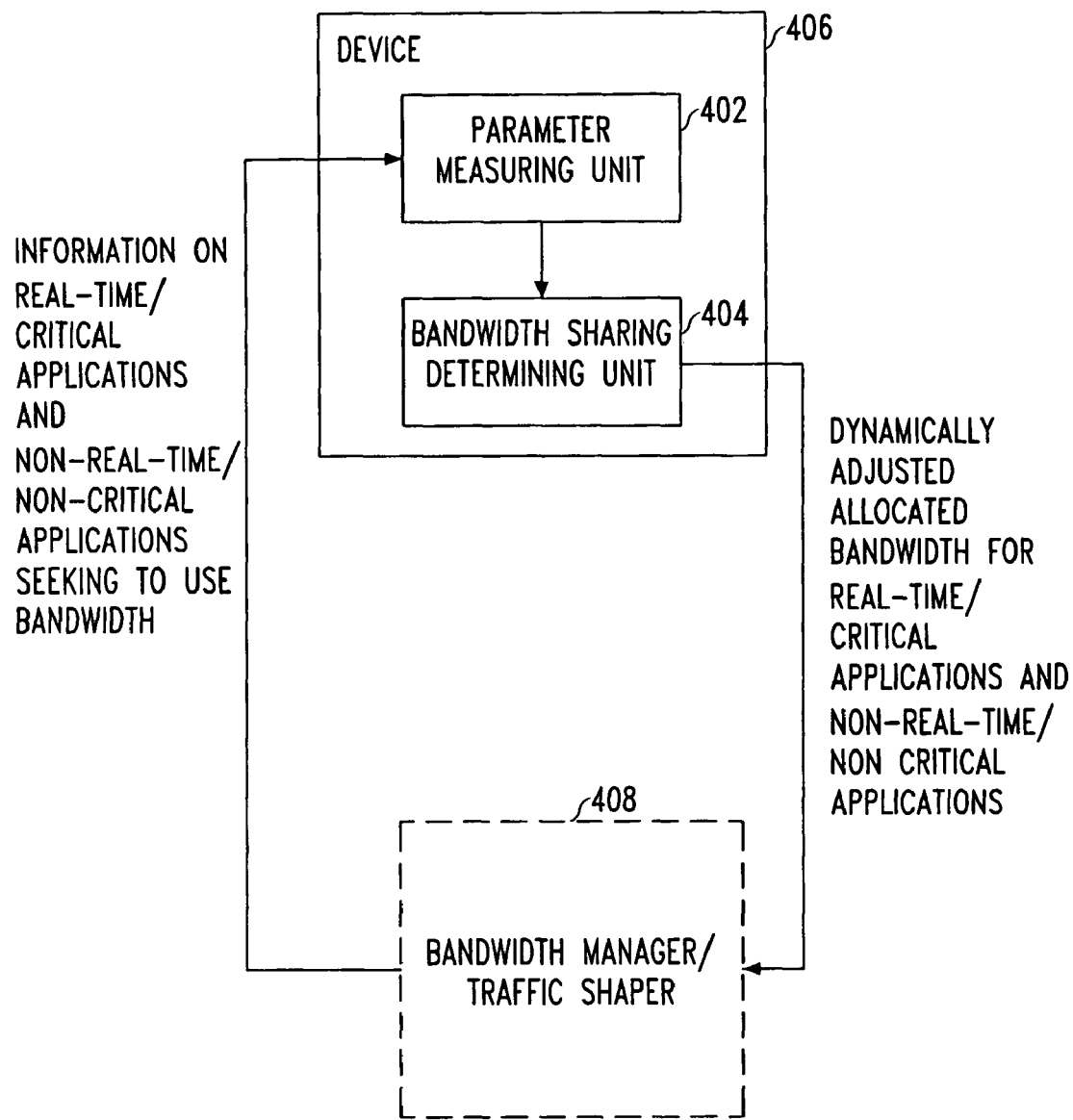
FIG. 4 is a block diagram showing one embodiment of a device for dynamically managing allocation of bandwidth in a packet network using a Dynamic Setting Scheme (DSS) for Class Based Queuing (CBQ) in accordance with the present invention.

FIG. 4 is a block diagram showing one embodiment of a device (406) for dynamically managing allocation of bandwidth in a packet network using a Dynamic Setting Scheme (DSS) for Class Based Queuing (CBQ). The device (406) typically includes a parameter measuring unit (402) and a bandwidth sharing determining unit (404). The parameter measuring unit (402) is coupled to a bandwidth sharing determining unit (404), and measures a predetermined parameter at predetermined observation window times. The bandwidth sharing determining unit (404) is coupled to the parameter measuring unit (402), and dynamically adjusts allocated bandwidth for parent classes of real-time or critical traffic by adjusting an average of the predetermined parameter to have a value within a predetermined stable region. Typically, the DSS provides for using measurable parameters such as queue length or number of borrowing attempts per a predetermined length of time or window of time as control triggers for implementing adjustment of bandwidth allocation. Where the predetermined parameter is a number of borrowing attempts during a measurement window, a maximum bandwidth and a minimum bandwidth for the predetermined stable region may be determined by:

If $A_{i\_avg}$<Thr$(A_i)^{lower}$, $B_i$=maximum$(B_i-\omega_i^{down}$, Min $(B_i))$ Else If $A_{i\_avg}$>Thr$(A_i)^{upper}$, $B_i$=minimum$(B_i+\omega_i^{up}$, Max$(B_i))$ as described more fully above. Where the predetermined parameter is a queue length, and a lower threshold and an upper threshold for queue length for the predetermined stable region may be determined by:

If $Q_{i\_avg} < \text{Thr}(Q_i)^{lower}$, $B_i = \text{maximum}(B_i - \omega_i^{down}, \text{Min}(B_i))$ Else If $Q_{i\_avg} > \text{Thr}(Q_i)^{upper}$, $B_i = \text{minimum}(B_i + \omega_i^{up}, \text{Max}(B_i))$, as described more fully above. The dynamically adjusted allocated bandwidth for real-time or critical applications and non-real-time or non-critical applications is sent by the bandwidth sharing determining unit (404) to a bandwidth manager or traffic shaper (408), which then sends information on the real-time or critical applications and non-real-time or non-critical applications seeking to use the bandwidth to the parameter measuring unit (402).

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. A method for dynamically managing allocation of bandwidth in a packet network comprising the steps of:
   maintaining a minimized reserved portion of bandwidth to minimize delay jitter; maximizing a shared portion of bandwidth to maximize overall bandwidth utilization;
   adjusting an average of a predetermined parameter associated with bandwidth control to have a value within a predetermined stable region; and
   via said adjusting step, dynamically affecting allocated bandwidth for parent classes of traffic in the packet network;
   wherein the predetermined parameter comprises a number of borrowing attempts per a predetermined length of time.

2. A method comprising the steps of:
   in a packet network, adjusting an average of a predetermined parameter associated with bandwidth control to have a value within a predetermined stable region; and
   via said adjusting step, dynamically affecting allocated bandwidth for parent classes of traffic;
   wherein the predetermined parameter is related to a number of borrowing attempts during a predetermined observation window time.

3. A method comprising the steps of:
   in a packet network adjusting an average of a predetermined parameter associated with bandwidth control to have a value within a predetermined stable region; and
   via said adjusting step, dynamically affecting allocated bandwidth for parent classes of traffic;
   further comprising: measuring the predetermined parameter as a number of borrowing attempts during a predetermined observation window time.

4. A method comprising the steps of:
   in a packet network, adjusting an average of a predetermined parameter associated with bandwidth control to have a value within a predetermined stable region; and
   via said adjusting step, dynamically affecting allocated bandwidth for parent classes of traffic;
   further comprising: calculating the average of the predetermined parameter from a number of borrowing attempts using exponential smoothing.

5. A method comprising the steps of:
   in a packet network, adjusting an average of a predetermined parameter associated with bandwidth control to have a value within a predetermined stable region; and
   via said adjusting step, dynamically affecting allocated bandwidth for parent classes of traffic;
   further comprising: calculating the average of the predetermined parameter from a number of borrowing attempts according to the formula, $A_{i\_avg} \Re (1-\alpha)*A_{i\_avg} + \alpha A_i$,
   wherein $A_{i\_avg}$ represents the average of the number of borrowing attempts, $A_i$ is a number of borrowing attempts during a most recent measurement window, a value of $\alpha$ is preselected as a negative power of two, and $A_{i\_avg}$ is updated every observation window, a pre-determined parameter in seconds.

6. A method comprising the steps of:
   in a packet network, adjusting an average of a predetermined parameter associated with bandwidth control to have a value within a predetermined stable region; and
   via said adjusting step, dynamically affecting allocated bandwidth for parent classes of traffic;
   wherein the predetermined parameter is related to a number of borrowing attempts and the predetermined stable region comprises a range bounded according to:

If $A_{i\_avg} > \text{Thr}(A_i)^{lower}$, $B_i = \text{maximum}(B_i - \omega_i^{down}, \text{Min}(B_i))$ Else If $A_{i\_avg} > \text{Thr}(A_i)^{lower}$, $B_i = \text{minimum}(B_i + \omega_i^{up}, \text{Max}(B_i))$ Where $A_i$ is a number of borrowing attempts during a most recent measurement window and
   $A_{i\_avg}$ is the average of the number of borrowing attempts/controlled state;
   upper and lower thresholds for the predetermined stable region are preset at predetermined values:
   $\text{Thr}(A_i)^{lower}$ is a lower threshold for borrowing attempts, where $\text{Thr}(A_i)^{lower} > 0$;
   $\text{Thr}(A_i)^{upper}$ is an upper threshold for borrowing attempts, where $\text{Thr}(A_i)^{upper} > \text{Thr}(A_i)^{lower}$;
   increment and decrement units $\omega_i^{down}$ and $\omega_i^{up}$, which denote an update granularity on allocated bandwidth $B_i$, are preset at predetermined values;
   $\text{Max}(B_i)$ is a maximum value of allocated bandwidth;
   $\text{Min}(B_i)$ is a minimum value of allocated bandwidth; and
   exponential smoothing technique is used as follows, $A_{i\_avg} \Re (1-\alpha)*A_{i\_avg} + \alpha*A_i$, wherein a value of $\alpha$ is preselected as a negative power of two and $A_{i\_avg}$ is updated every observation window, a pre-determined parameter in seconds.

7. A method comprising the steps of:
   in a packet network, adjusting an average of a predetermined parameter associated with bandwidth control to have a value within a predetermined stable region; and
   via said adjusting step, dynamically affecting allocated bandwidth for parent classes of traffic;
   further comprising: calculating the average of the predetermined parameter as a queue length according to the formula, $Q_{i\_avg} \Re (1-\alpha)*Q_{i\_avg} + \alpha*Q_i$, wherein $Q_{i\_avg}$ represents the average of the queue length, $Q_i$ is an instantaneous measurement of queue length, a value of $\alpha$ is preselected as a negative power of two, and $Q_{i\_avg}$ is updated every observation window, a pre-determined parameter in seconds.

8. A method comprising the steps of:

in a packet network, adjusting an average of a predetermined parameter associated with bandwidth control to have a value within a predetermined stable region; and via said adjusting step, dynamically affecting allocated bandwidth for parent classes of traffic;

wherein the predetermined parameter is related to a queue length and the predetermined stable region comprises a region bounded according to:

If $Q_{i\_avg} < \text{Thr}(Q_i)^{lower}$, $B_i = \text{maximum}(B_i - \omega_i^{down}, \text{Min}(B_i))$ Else If $Q_{i\_avg} > \text{Thr}(Q_i)^{upper}$, $B_i = \text{minimum}(B_i + \omega_i^{up}, \text{Max}(B_i))$, $Q_i$ is an instantaneous measurement of queue length;

$Q_{i\_avg}$ is a calculated average value for an average queue length;

upper and lower thresholds are preset at predetermined values:

$\text{Thr}(Q_i)^{lower}$ is a lower threshold for queue length, where $\text{Thr}(Q_i)^{lower} > 0$;

$\text{Thr}(Q_i)^{upper}$ is an upper threshold for queue length where $\text{Thr}(Q_i)^{upper} > \text{Thr}(Q_i)^{lower}$;

increment and decrement units $\omega_i^{down}$ and $\omega_i^{up}$, which denote an update granularity on allocated bandwidth $B_i$, are preset at predetermined values;

Max $(B_i)$ is a maximum value of allocated bandwidth;

Min $(B_i)$ is a minimum value of allocated bandwidth; and a queue size for class i, which is also an upper bound for a queue length $Q_i$, is related to an upper bound on a delay jitter as:

Delay_jitter_$i = \text{max} Q_i / B_i$ wherein, if a jitter upper bound Delay_jitter_i is preselected, then a linear relationship exists between maxQ$_i$ and B$_i$, an allocated bandwidth.

* * * * *